(12) United States Patent
Dallan

(10) Patent No.: US 11,919,282 B2
(45) Date of Patent: Mar. 5, 2024

(54) METHOD OF JOINING METAL SHEETS AND METAL LAMINATE ASSEMBLY, IN PARTICULAR MADE WITH THIS METHOD

(71) Applicant: DALLAN S.P.A., Treviso (IT)

(72) Inventor: Andrea Dallan, Treviso (IT)

(73) Assignee: DALLAN S.P.A., Treviso (IT)

( * ) Notice: Subject to any disclaimer, the term of this patent is extended or adjusted under 35 U.S.C. 154(b) by 0 days.

(21) Appl. No.: 17/671,638

(22) Filed: Feb. 15, 2022

(65) Prior Publication Data

US 2022/0258461 A1 Aug. 18, 2022

(30) Foreign Application Priority Data

Feb. 16, 2021 (IT) .................. 102021000003482

(51) Int. Cl.
  *B32B 37/00* (2006.01)
  *B21D 39/02* (2006.01)
  (Continued)

(52) U.S. Cl.
  CPC ........ *B32B 37/0076* (2013.01); *B21D 39/021* (2013.01); *B32B 7/08* (2013.01);
  (Continued)

(58) Field of Classification Search
  CPC .... B21D 39/02; B21D 39/021; B21D 39/023; B21D 47/04; Y10T 29/4924; Y10T 29/4936; Y10T 29/49924; Y10T 29/49908; Y10T 29/49915; Y10T 29/49936; B32B 37/18; F16B 5/0096; F16B 5/0012
  (Continued)

(56) References Cited

U.S. PATENT DOCUMENTS 2,076,228 A * 4/1937 Dressing ................ B21D 39/02
  72/181
3,015,293 A * 1/1962 Parham .................. B21D 39/02
  74/108

(Continued)

FOREIGN PATENT DOCUMENTS

CN     102389916 A    3/2012
DE   102013013735 A1  2/2015
(Continued)

*Primary Examiner* — Katrina M Stransky
*Assistant Examiner* — P Derek Pressley
(74) *Attorney, Agent, or Firm* — AremFox Schiff LLP; Michael Fainberg

(57) ABSTRACT

This invention concerns a method of joining metal sheets, comprising the following operating steps: a) providing a first metal sheet and a second metal sheet intended to be joined together in the vicinity of a first and a second straight edge, respectively; b) bending said first metal sheet parallel to said first edge so as to obtain a first edge flap; c) bending into a U- or V-shape a portion of said second metal sheet parallel to said second edge to obtain a longitudinal pocket in such a way that between said second edge and said pocket a second edge flap is defined; d) coupling said first metal sheet with said second metal sheet inserting said first flap inside said pocket; e) bending said pocket and the first flap inserted therein against said second flap so as to create an irreversible mechanical joint between the two metal sheets.

18 Claims, 6 Drawing Sheets

(51) Int. Cl.
*B32B 7/08* (2019.01)
*B32B 15/01* (2006.01)
*B32B 37/18* (2006.01)
*B32B 38/00* (2006.01)

(52) U.S. Cl.
CPC .............. *B32B 15/01* (2013.01); *B32B 37/18* (2013.01); *B32B 38/0012* (2013.01)

(58) Field of Classification Search
USPC ...................................... 52/528, 536; 29/505
See application file for complete search history.

(56) References Cited

U.S. PATENT DOCUMENTS

| | | | | |
|---|---|---|---|---|
| 3,213,817 | A * | 10/1965 | Hunziker | B21D 39/02 |
| | | | | 29/243.57 |
| 4,171,599 | A * | 10/1979 | Lipp | B21C 37/101 |
| | | | | 52/536 |
| 5,939,212 | A | 8/1999 | Ragland et al. | |
| 6,814,106 | B1 * | 11/2004 | Iizuka | F24F 13/0254 |
| | | | | 138/DIG. 4 |
| 2015/0084378 | A1 * | 3/2015 | Huhn | B62D 25/06 |
| | | | | 296/210 |

FOREIGN PATENT DOCUMENTS

FR   1573379 A   7/1969
WO   WO-2013007522 A1 *  1/2013  .......... B21D 13/045

* cited by examiner

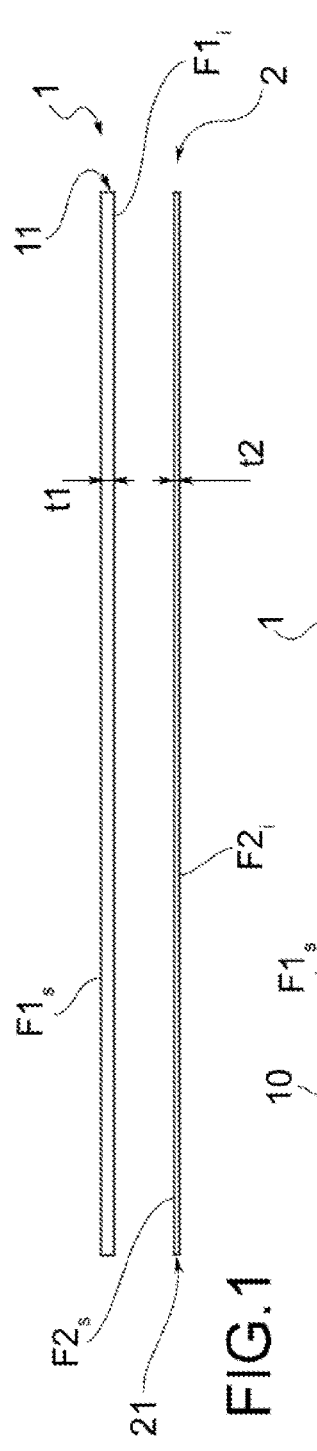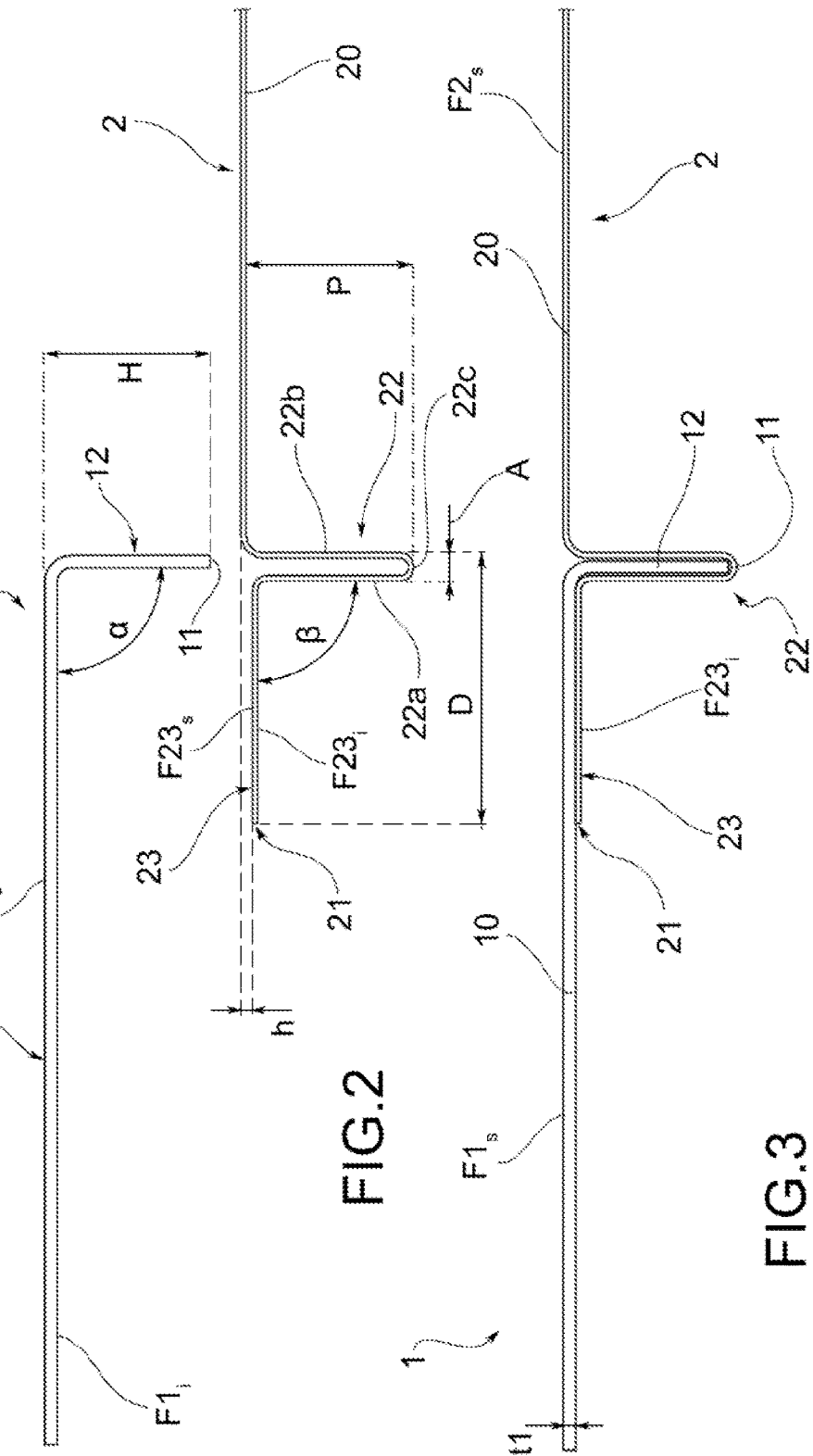

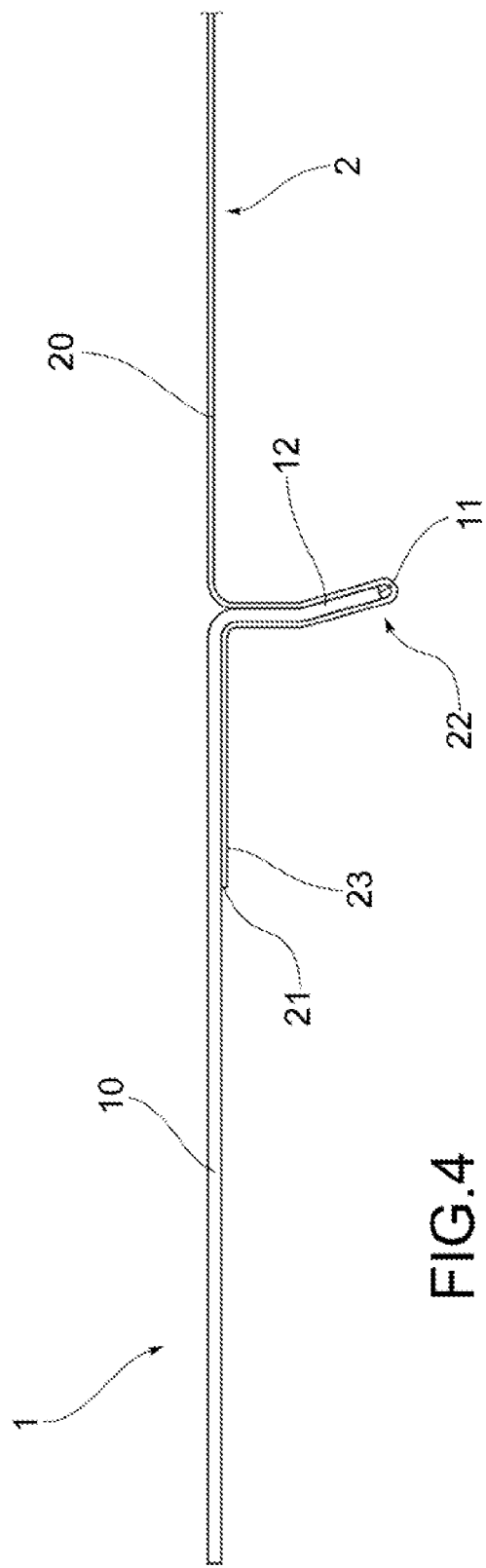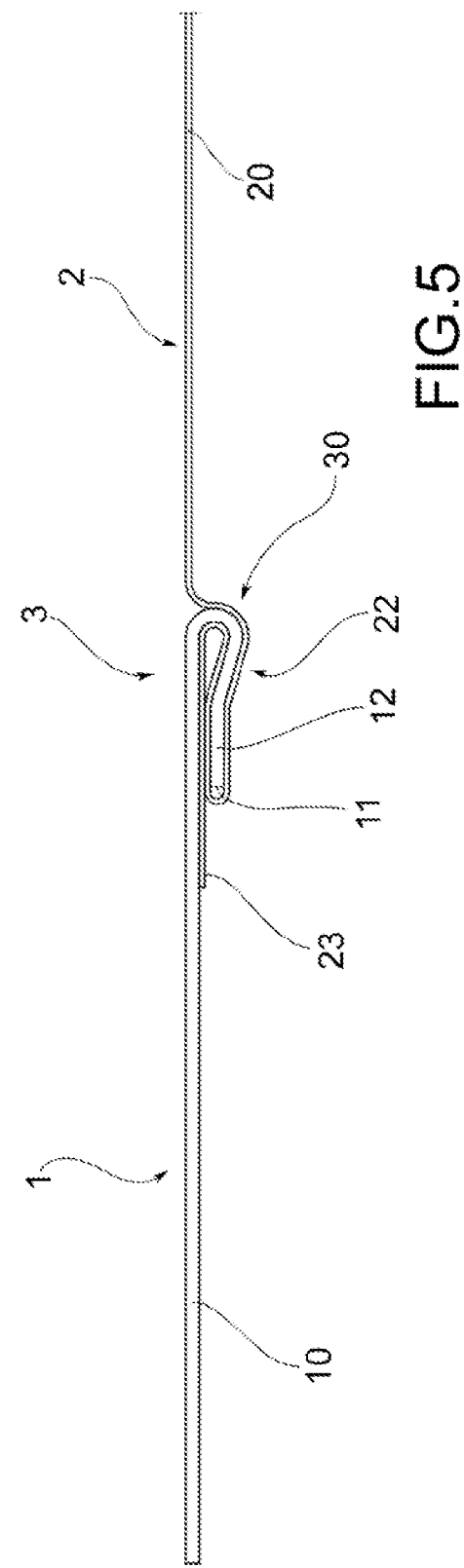

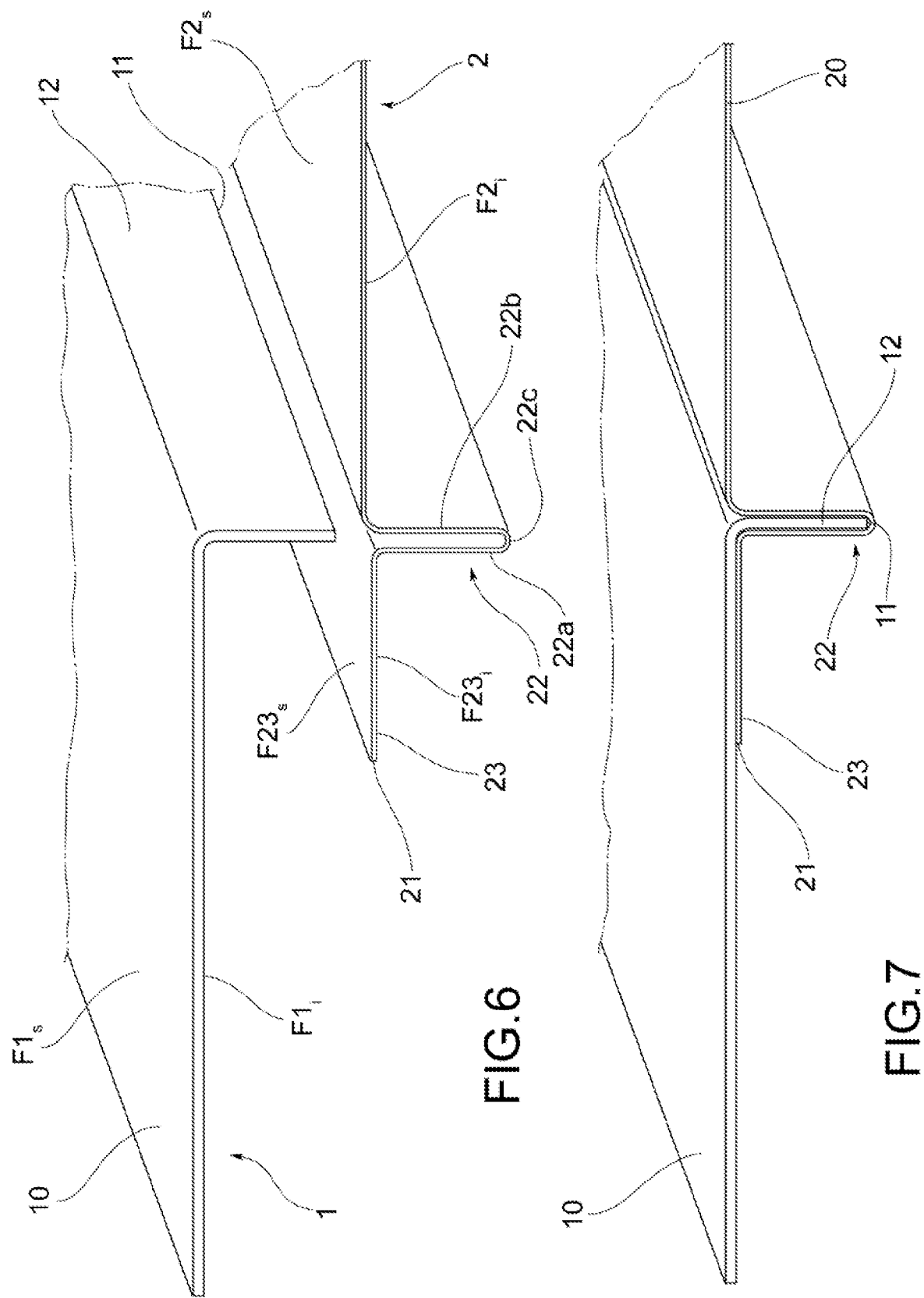

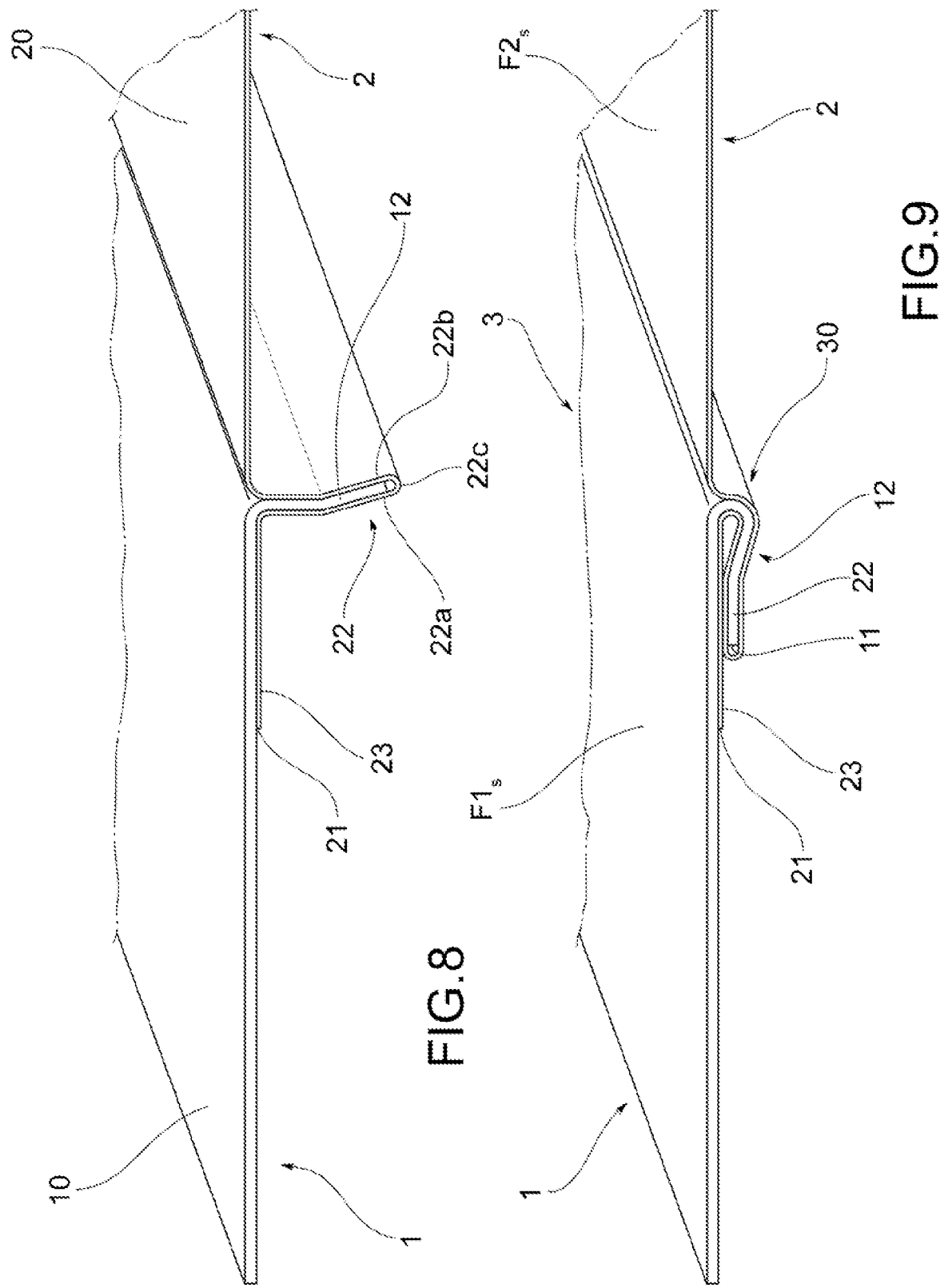

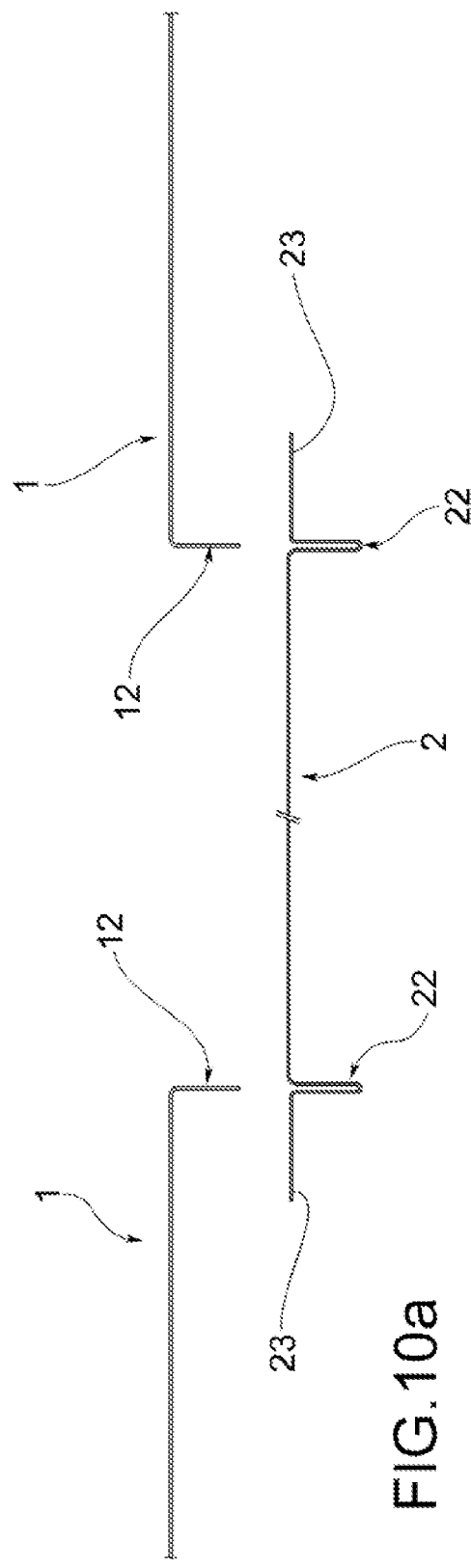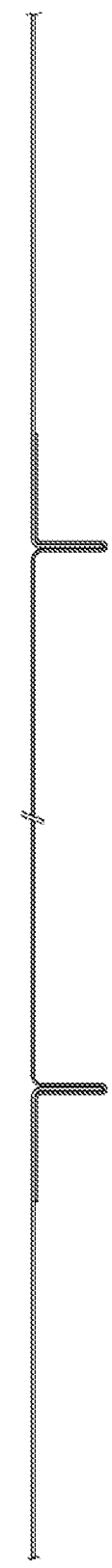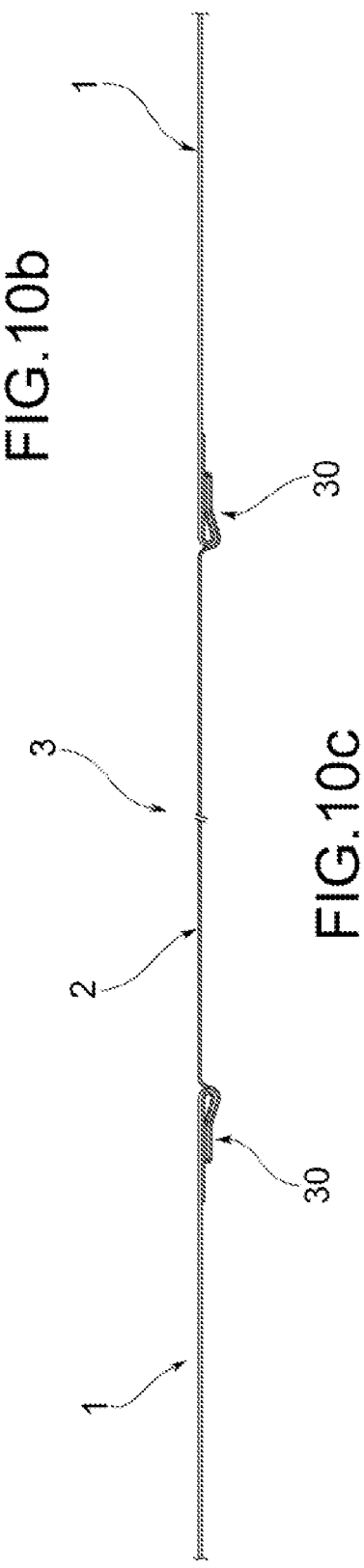

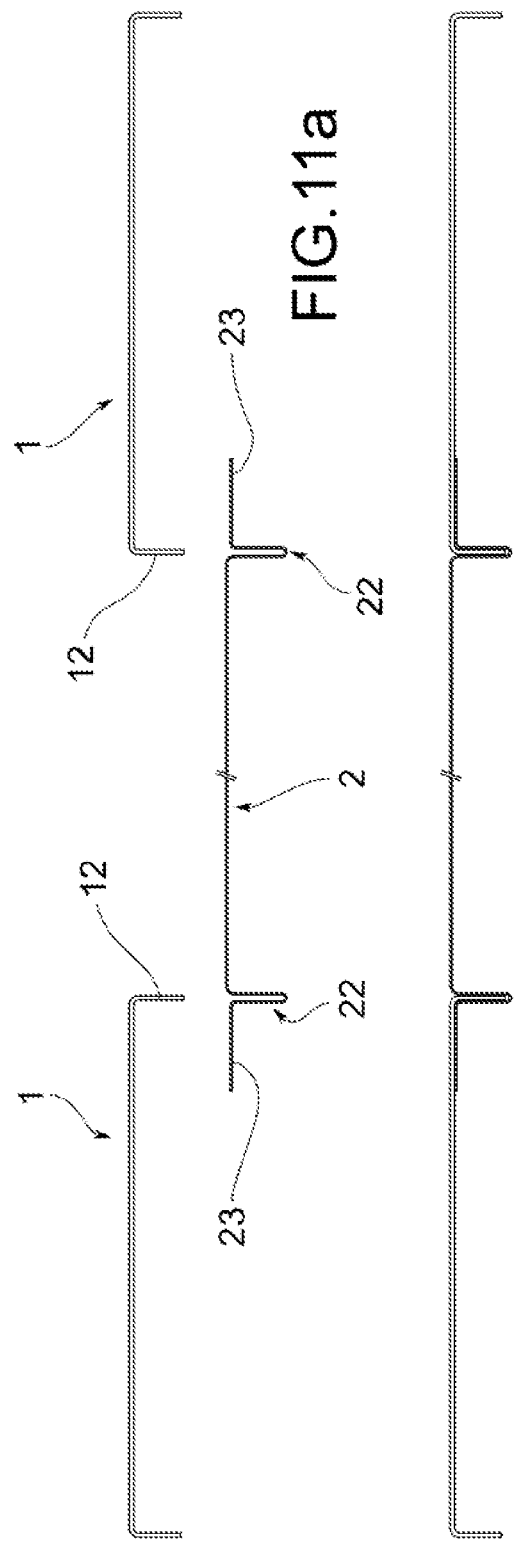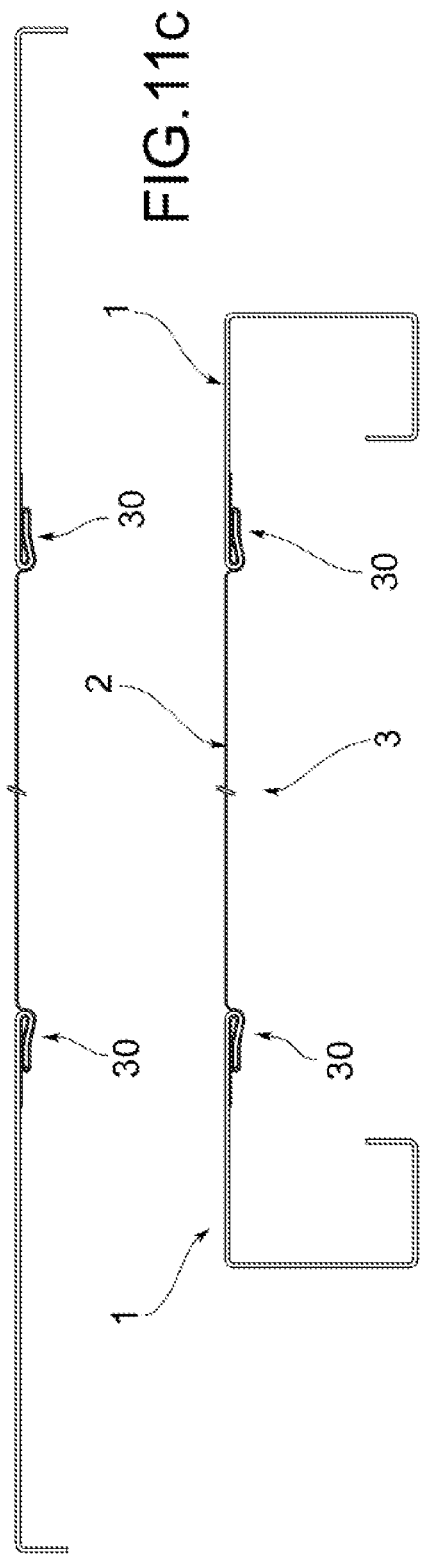

METHOD OF JOINING METAL SHEETS AND METAL LAMINATE ASSEMBLY, IN PARTICULAR MADE WITH THIS METHOD

CROSS-REFERENCE TO RELATED APPLICATIONS

This application claims priority to Italian Patent Application No. 102021000003482 filed on Feb. 16, 2021, the entire contents of which is hereby incorporated in its entirety by reference.

FIELD OF APPLICATION

A subject of this invention is a method of joining metal sheets and a metal laminate assembly, in particular made by such a method.

Advantageously, the joining method according to the invention is particularly suitable for joining flat metal sheets.

The metal laminate assembly according to the invention, obtainable in particular by the joining method according to the invention, may comprise portions of laminate materials having different thickness, material, and/or surface finish.

Advantageously, the metal laminate assembly according to the invention may be used in any manufacturing industry involving the use of metal laminate materials, particularly metal sheets.

Advantageously, the metal laminate assembly according to the invention may be subjected to any processing that is normally performed on a metal sheet, such as bending, profiling, drilling, punching, and cutting.

BACKGROUND

It is known to make structures starting from metal sheets.

It is also known to fabricate structures comprising portions that differ from each other in the type of metal sheet used, for example in terms of material, thickness, and/or surface finish. The use of different types of metal sheets in the same structure may be dictated by specific functional requirements that the different portions of the structure must fulfill or simply by material saving requirements.

As is well known, the connection between metal sheets may be made using a variety of techniques, such as by gluing, welding, riveting, clinching, or crimping.

The execution of said operations on metal sheets, particularly if of different thicknesses, may, however, involve technical difficulties that are not always easy to overcome.

In some cases, some bonding techniques are not economically justifiable, or are excessively complex to perform, or do not provide aesthetically acceptable results. This is the case, for example, when welding and clinching thin metal sheets.

Riveting is also a widely used technique, but does not always ensure acceptable aesthetic results.

Gluing ensures very satisfactory aesthetic results. The use of adhesives requires, however, the availability of dedicated equipment and adapting the production process to the technical times for gluing.

Crimping is also a widely used technique. In crimping, the two edges to be joined are first overlapped and then folded together twice on themselves, obtaining a mechanically irreversible joint. The main operational limitation of crimping is that in order to obtain a precise joining of the flaps, it is necessary to initially ensure a precise and stable positioning of the two flaps to be joined. In many cases said positioning is not easy to achieve and becomes an operational complication that makes crimping not always possible.

The need for precise and stable positioning of the two flaps to be joined is an issue common to all metal sheet joining techniques and has not yet been satisfied in a simple way.

Therefore, in the metal sheet processing field there is a need for a method for joining metal sheets that is easily executable and allows for precise and stable positioning of the two flaps to be joined during the joining operations of two metal sheets, particularly flat ones.

SUMMARY

Therefore, it is a principal object of this invention to eliminate in whole or in part the drawbacks of the aforementioned prior art by providing a method of joining metal sheets that is easily executable and enables precise and stable positioning of the two flaps to be joined during the operations of joining two metal sheets, particularly flat ones.

A further object of this invention is to provide a method of joining metal sheets that allows for a coupling mechanically strong between two metal sheets.

A further object of this invention is to provide a method of joining metal sheets that is economical to perform.

BRIEF DESCRIPTION OF THE DRAWINGS

The technical features of the invention, according to the aforesaid aims, may clearly be seen in the content of the claims below, and its advantages will become more readily apparent in the detailed description that follows, made with reference to the accompanying drawings, which illustrate one or more purely illustrative and non-limiting embodiments thereof, wherein:

FIG. 1 schematically shows a first operational step of the method of joining metal sheets according to a preferred embodiment of the invention;

FIG. 2 schematically shows a second operational step of the method of joining metal sheets according to a preferred embodiment of the invention;

FIG. 3 schematically shows a third operational step of the method of joining metal sheets according to a preferred embodiment of the invention;

FIG. 4 schematically shows a fourth operational step of the method of joining metal sheets according to a preferred embodiment of the invention;

FIG. 5 schematically shows a fifth operational step of the method of joining metal sheets according to a preferred embodiment of the invention;

FIG. 6 is a first perspective view of some of the operational steps of the metal sheet joining method shown in FIG. 1 through 5;

FIG. 7 is a second perspective view of some of the operational steps of the metal sheet joining method shown in FIG. 1 through 5;

FIG. 8 is a third perspective view of some of the operational steps of the metal sheet joining method shown in FIG. 1 through 5;

FIG. 9 is a fifth perspective view of some of the operational steps of the metal sheet joining method shown in FIG. 1 through 5;

FIG. 10a schematically shows a first operational step of the method according to the invention applied for joining three metal sheets to obtain a flat metal laminate assembly;

FIG. 10b schematically shows a second operational step of the method according to the invention applied for joining three metal sheets to obtain a flat metal laminate assembly;

FIG. 10c schematically shows a third operational step of the method according to the invention applied for joining three metal sheets to obtain a flat metal laminate assembly;

FIG. 11a schematically shows a first operational step of the method according to the invention applied for joining three metal sheets to obtain a profiled metal laminate assembly;

FIG. 11b schematically shows a second operational step of the method according to the invention applied for joining three metal sheets to obtain a profiled metal laminate assembly;

FIG. 11c schematically shows a third operational step of the method according to the invention applied for joining three metal sheets to obtain a profiled metal laminate assembly; and FIG. 11d schematically shows a fourth operational step of the method according to the invention applied for joining three metal sheets to obtain a profiled metal laminate assembly.

DETAILED DESCRIPTION

For simplicity of description, the method according to the invention will be described with respect to joining two metal sheets. It is understood that this method may be applied to join together two-by-two also three or more metal sheets (as shown for example in FIGS. 10 and 11) and is therefore not limited to the joining of two metal sheets only.

According to a general embodiment of the invention, the method of joining metal sheets comprises an operative step of a) arranging at least a first metal sheet 1 and a second metal sheet 2 intended to be joined together to form a metal laminate assembly 3.

Each metal sheet 1, 2 has its own thickness, indicated in the figures by t1 for the first metal sheet 1 and by t2 for the second metal sheet. Advantageously, the method according to the invention may be applied to join two metal sheets 1 and 2 having the same thickness or having different thicknesses (as shown in the attached figures).

Each metal sheet 1, 2 has an upper surface and a lower surface, opposite each other in the direction of thickness. In the figures, the upper surface of the first metal sheet 1 is shown as F1s, while the lower surface of the first metal sheet 1 is shown as F1i; the upper surface of the second metal sheet 2 is shown as F2s, while the lower surface of the second metal sheet 2 is shown as F2i.

The first metal sheet 1 and the second metal sheet 2 have, respectively, at least a first straight edge 11 and a second straight edge 21 in the vicinity of which edges the two sheets are intended to be joined. Hereinafter, said two edges 11 and 21 may also be known as joining edges.

Advantageously, the step a) of arranging said at least two metal sheets 1 and 2 may comprise any processing suitable to give the same metal sheets features, for example of shape and/or surface finish, that are to be present in the laminate assembly 3.

Preferably, in step a), the sheets may be subjected to cutting to have the shape and dimensions required for each sheet in the laminate assembly 3. In particular, the sheets 1 and 2 may be cut from individual sheets of metal sheets (particularly in the case of thick metal sheets) or from strips of metal sheet (particularly in the case of thin sheets).

In addition to, or as an alternative to, cutting operations, in step a) the sheets 1 and 2 may be subjected to other pre-processing, such as profiling, bending, or punching. FIG. 11a illustrates the case wherein some metal sheets may have been previously subjected to profiling or bending before being joined together following the method of the invention.

Alternatively, step a) may also be limited to the supply of metal sheet only, without any specific pre-processing of the same. More specifically, this choice may be made in the case wherein the laminate assembly obtained from joining the metal sheets is intended to feed different processing lines and is considered in itself as a semi-finished product rather than a finished product, as shown for example in FIG. 10c.

The same choice may also be made in the case wherein the laminate assembly obtained from the joining of the metal sheets is intended to feed a single processing line, but it is preferred to concentrate most or even all of the machining on the laminate assembly, rather than on the individual separate sheets.

According to a general embodiment of the invention, after step a) the method comprises two steps of bending b) and c) the two metal sheets 1 and 2 in the vicinity of the respective joining edges 11 and 21, as shown in FIGS. 2 and 6.

Step b) involves bending the first metal sheet 1, and step c) involves bending the second metal sheet 2.

In the following description, the expression "sheet body" means the portion of the metal sheet not involved in the bending operations of steps b) and c).

More specifically, step b) involves bending said first metal sheet 1 parallel to said first edge 11 so as to obtain a first edge flap 12 that:
  forms a bend angle α with respect to the lower surface F1i of a sheet body 10 of said first metal sheet 1 and
  has a predefined extension H orthogonal to the first edge 11.

Preferably, as shown in the attached figures, the aforesaid bending angle α is equal to 90°. In this case, the bending step b) consists in bending a portion of the first metal sheet 1 in an L-shape in the vicinity of the first edge 11 so as to obtain the aforesaid first edge flap 12 arranged orthogonally with respect to the sheet body 10.

According to alternative embodiments not shown in the attached figures, the aforesaid bending angle α may be less than or greater than 90°.

Step c) involves bending a portion of said second metal sheet 2 parallel to said second edge 21 into a U- or V-shape to obtain a longitudinal pocket 22 that:
  extends in depth P at an angle from a metal sheet body 20 of said second metal sheet 2 and
  has a predefined minimum width A transverse to said second edge 21.

In particular, two opposite walls 22a and 22b may be defined in the pocket 22, connected by a bottom 22c. In the case of bending in a U-shape, the two walls 22a and 22b are parallel to each other, while in the case of bending in a V-shape, the two walls 22a and 22b are convergent towards the bottom 22c.

The expression "extends in depth at an angle from the sheet body" means that the walls 22a and 22b extend according to planes incident the two surfaces F2s and F2i of the second metal sheet 2.

As shown in particular in FIG. 2, the aforesaid pocket 22 is obtained at a predefined distance D from the second edge 21 such that a second edge flap 23 of said second metal sheet 2 is defined between the second edge 21 and the pocket 22, said second edge flap having an upper surface F23s arranged parallel to the upper surface F2s of the sheet body 20 of said second metal sheet 2.

The longitudinal pocket 22 forms with a lower surface F23i of the second edge flap 23 an angle β that is substantially equivalent to the aforesaid bending angle α between the first flap 12 and the sheet body 10 of the first metal sheet 1. As shown in FIG. 2, the angle β is defined with reference to the portion of the metal sheet defining the wall 22a of the pocket 22, which is directly connected to the second edge flap 23.

Preferably, as shown in the attached figures, said angle β is equal to 90°.

As will be clarified in the following description, the minimum width A of the pocket 22 is not less than the thickness t1 of the first metal sheet 1, while the extension P of the pocket 22 in depth is not less than the extension H of the first flap 12.

According to a general embodiment of the invention, after the two bending steps b) and c) the method comprises a step d) of coupling the first metal sheet 1 with the second metal sheet 2.

More specifically, as shown in FIGS. 3 and 7, step d) involves coupling the first metal sheet 1 with the second metal sheet 2 by inserting the first flap 12 inside the pocket 22 up to bring the lower surface F1i of the sheet body 10 of the first metal sheet 1 to rest on the upper surface F23s of the second flap 23.

This operation allows the first metal sheet 1 to be stably positioned on the second metal sheet 2 with the two respective sheet bodies 10, 20 arranged parallel to each other. This operation (with the relative advantages in terms of stable and precise positioning of the two sheets) is made possible by the presence of the second flap 23, which performs a function of support base for the sheet body 10 of the first metal sheet, and by the fact that the pocket 22 is configured with respect to the first flap 12 in such a way that said pocket 22, in receiving therein the first flap 12, allows mutual support between the second flap 23 and the sheet body 10.

It is in this sense that the feature relative to the fact that the longitudinal pocket 22 forms with the lower surface F23i of the second edge flap 23 an angle β that is substantially equivalent to the aforesaid bending angle α between the first flap 12 and the sheet body 10 has to be interpreted. The pocket 22 has to be configured to promote complete entry of the first flap 12 therein and thereby allow mutual support between the second flap 23 and the sheet body 10.

According to a general embodiment of the invention, after the coupling step d) the method comprises a step e) of folding the pocket 22.

More specifically, as shown in FIGS. 5 and 9, step e) involves bending the pocket 22 and the first flap 12 inserted therein against the second flap 23 so as to create an irreversible mechanical joint between the two sheets 1, 2 at said two edge flaps 12, 23 and said pocket 22. Thus, a metal laminate assembly 3 is formed wherein the upper surfaces F1s, F2s of the sheet bodies 10, 20 of said two metal sheets 1, 2 are arranged parallel to each other.

Due to the invention, two metal sheets may be joined by simply ensuring precise and stable positioning of the two edges of the two metal sheets to be joined.

As already pointed out, this result is obtainable due to the presence of the second flap 2, which performs the function of a support base for the sheet body 10 of the first metal sheet, and due to the fact that the pocket 22 is configured with respect to the first flap 12 in such a way that the pocket 22, in receiving therein the first flap 12, allows mutual support between the second flap 23 and the sheet body 10.

Preferably, as shown in the attached figures, the pocket 22 is counter-shaped relative to the first flap 12 so as to allow interference or shape coupling between the pocket 22 and the first flap 12 in the aforesaid coupling step d). Thus, already after step d) the mutual positioning between the two metal sheets 1 and 2 is even more stable. In particular, the pocket 22 is obtained by a U-shaped bend, wherein the width A of the pocket is substantially equivalent to the thickness t1 of the first metal sheet 1.

Alternatively, the pocket 22 may be shaped to accommodate therein the first flap 12 in the aforesaid step d) of coupling without shape or interference coupling. In particular, the pocket 22 is obtained by a V-shaped bend, wherein the minimum width A of the pocket is substantially equivalent to or greater than the thickness t1 of the first metal sheet 1.

According to a preferred embodiment of the invention, the method of joining metal sheets comprises a step f) of at least partially deforming the pocket 22 together with the first flap 12 contained therein before performing the aforesaid step e) of bending the pocket 22, as shown in FIGS. 4 and 8. The purpose of executing said step f) is to create an irreversible coupling between the second metal sheet 2 and the first flap 12 at the pocket 22. In this way, the positioning between the two sheets 1 and 2 is definitively stabilized, avoiding the risk of mutual displacements (for example due to slipping of the first flap along the pocket) during the bending step e). This step f) is particularly suitable in cases where the pocket 22 is obtained by a U-shaped bend or the pocket 22 is not counter-shaped with respect to the first flap 12. Operationally, step f) is aimed at closing the pocket 22 against the first flap 12 inserted therein.

Advantageously, the deformation step f) may be achieved in any way that leads to irreversible coupling between the walls of the pocket and the first flap. In particular, this may be achieved by folding the end part of the pocket with respect to its top part, as shown in the attached figures.

Preferably, as shown in particular in FIGS. 2 and 3, the upper surface F23s of said second edge flap 23 is lowered relative to the upper surface F2s of the sheet body 20 of the second metal sheet 2 by a predefined height h equivalent to the thickness t1 of the first metal sheet 1. Thus, at the second flap 23, a housing is created for the sheet body 10 of the first metal sheet 1 during the coupling step d), which allows the upper surface F1s of the sheet body 10 of the first metal sheet 1 to be positioned in a coplanar manner to the upper surface F2s of the sheet body 20 of the second metal sheet 2.

In particular, the method according to the invention may be applied to join metal sheets of different thicknesses. In such a case, preferably, the first metal sheet 1 has a thickness t1 greater than the thickness t2 of the second metal sheet 2. In this way two results are achieved.

A first result is operative: the second metal sheet 2, subject to a more complex bending (formation of the pocket and of the second flap), is the one with lesser thickness. This facilitates bending operations.

A second result is in terms of the strength of the coupling area between the two sheets (joint 30). In the joint that is obtained between the two metal sheets, the second metal sheet 2 is the one that, folded several times on itself, participates with a greater linear development in the coupling. Choosing the second metal sheet as the thinner sheet increases the section of the joint of the less resistant sheet, which is the thinner one being the material equal. In conclusion, a mechanically more stable and balanced joint is obtained than if the second metal sheet 2 was the one with the greater thickness.

The first metal sheet 1 and the second metal sheet 2 may be made of the same or different metal materials.

The first metal sheet 1 and the second metal sheet 2 may have the same surface finish or may have different surface finishes.

As may be seen in particular in FIG. 2, the distance D between the pocket 22 and the second edge 21 substantially defines the extension of the second edge flap 23 transversely to the second edge 21.

Preferably, the predefined distance D is at least equal to the depth extension P of the pocket 22. In this way, it is ensured that the second flap 23 has sufficient extension to interpose itself between the sheet body 10 and the pocket 22 (with the associated first flap 12) along the entire extension of the pocket. Due to this, the folding of the pocket 22 against the second flap 23 has the advantageous effect of keeping the second flap 23 adherent against the first metal sheet 1, helping to make the joint thus obtained stronger.

The greater the distance D, the greater the extension of the second edge flap 23 transversely to the second edge 21. As a result, the support surface offered by the second flap 23, and thus the positive effect in terms of stability in the mutual positioning between the first metal sheet 1 and the second metal sheet 2, is larger.

Advantageously, the joining method according to the invention may be performed in an automated manner in metal sheet processing plants comprising in particular bending or profiling machines, known per se to a person skilled in the art. This makes the method of joining metal sheets according to the invention economical to execute.

A subject of this invention is a metal laminate assembly 3 comprising at least a first metal sheet 1 and a second metal sheet 2 joined together at a first 11 and a second straight edge 21, respectively, by an irreversible mechanical coupling.

For simplicity of description, the laminate assembly 3 according to the invention will be described in relation to the joining of two metal sheets. It is understood that said assembly 3 may comprise three or more sheets (as shown, for example, in FIGS. 10c and 11c and 11d) and is therefore not limited to the joining of only two sheets.

Preferably, the metal laminate assembly 3 according to the invention is obtainable by joining together the first 1 and the second metal sheet 2 following the method of joining metal sheets according to this invention and in particular as described above.

For descriptive simplicity, the metal laminate assembly 3 will be described using the same numerical references used in the description of the method.

Each metal sheet 1, 2 has a respective upper surface F1s, F2s and a respective lower surface F1i, F2i opposite each other in the direction of the thickness.

According to the invention, as shown in FIGS. 5 and 9, the aforesaid irreversible mechanical coupling is defined by:
- a first edge flap 12 of said first metal sheet 1 that extends along the first edge 11 of said first metal sheet 1 and is bent against the lower surface F1i of said first metal sheet 1;
- a second edge flap 23 of the second metal sheet 2 extending along the second edge 21 of the second metal sheet 2 and resting on the lower surface F1i of the first metal sheet 1, interposed between the first edge flap 12 and the lower surface F1i of the first metal sheet 1.

Said second flap 23 is connected to the remainder of the second metal sheet 2 by a bent portion 22 of said second metal sheet 2, said bent portion 22 being bent around the first flap 12, interposing itself between the first flap 12 and the second flap 23.

Referring to that which has already been pointed out in discussing the coupling obtainable by the method according to the invention, the aforesaid irreversible mechanical coupling present in the metal laminate assembly 3 is mechanically strong and stable.

Preferably, the upper surface F23s of the second flap 23 is parallel to the upper surface F2s of the second metal sheet 2. The upper surface F1s of the first metal sheet 1 is parallel to the upper surface F2s of the second metal sheet 2.

Preferably, the upper surface F23s of the second flap 23 is lowered with respect to the upper surface F2s of the second metal sheet 2 by a height h equivalent to the thickness t1 of the first metal sheet 1. The upper surface F1s of the first metal sheet 1 is coplanar to the upper surface F2s of the second metal sheet 2.

The first metal sheet 1 and the second metal sheet 2 may have the same thickness or different thicknesses. In the latter case, preferably, the first metal sheet 1 has a thickness t1 greater than the thickness t2 of the second metal sheet 2.

The first metal sheet 1 and the second metal sheet 2 may be made of the same or different metal materials.

The first metal sheet 1 and the second metal sheet 2 may have the same surface finish or may have different surface finishes.

As shown, for example, in FIG. 10c, the metal laminate assembly 3 may constitute a substantially flat body.

As shown, for example, in FIG. 11d, the metal laminate assembly 3 may constitute a profiled body. Preferably, the profiling is achieved by operating on the laminate assembly 3.

The invention provides numerous advantages, some of which have already been described.

The method of joining metal sheets according to the invention is easily executable and enables precise and stable positioning of the two flaps to be joined during joining operations of two metal sheets, particularly flat ones.

The method of joining metal sheets according to the invention enables a mechanically strong and stable coupling between two sheets to be obtained.

The method of joining metal sheets according to the invention is economical to execute.

The invention thus conceived therefore achieves its intended objects.

Obviously, in its practical embodiment, it may also assume forms and configurations different from the one shown above without thereby departing from the present scope of protection.

Moreover, all details may be replaced by technical equivalent elements and the dimensions, the forms, and the materials employed may be any, depending on the needs.

The invention claimed is:

1. A method of joining metal sheets, comprising the following operating steps:
   (a) providing at least a first metal sheet and a second metal sheet intended to be joined together in the vicinity of a first and a second straight edge, respectively, to form a metal laminate assembly, each metal sheet having a respective upper surface and a respective lower surface opposite each other in the direction of the thickness;
   (b) bending said first metal sheet parallel to said first edge so as to obtain a first edge flap forming a bending angle with respect to the lower surface of a sheet body of said first metal sheet and having a predefined extension perpendicular to said first edge;
   (c) bending into a U- or V-shape a portion of said second metal sheet parallel to said second edge to obtain a longitudinal pocket extending in depth at an angle from a sheet body of said second metal sheet and having a predetermined minimum width transversely to said second edge, wherein said pocket is obtained at a predefined distance from said second edge in such a way that between said second edge and said pocket a second edge flap of said second metal sheet is defined having an upper surface placed parallel to the upper surface of the sheet body of said second metal sheet, and wherein said pocket forms with a lower surface of said second edge flap an angle substantially equivalent to said bending angle, the minimum width of said pocket not being less than a thickness of said first metal sheet and the depth of said pocket not being less than the extension of said first edge flap, wherein said predefined distance between said pocket and said second edge is at least equal to an extension in depth of said pocket;

(d) coupling said first metal sheet with said second metal sheet by inserting said first flap inside said pocket to bring the lower surface of the sheet body of said first metal sheet to rest on the upper surface of said second flap; and (e) bending said pocket and the first flap inserted therein against said second flap so as to create an irreversible mechanical joint between the two metal sheets at said two edge flaps and said pocket, thereby forming a metal laminate assembly wherein the upper surfaces of the sheet bodies of said two metal sheets are arranged parallel to each other.

2. The method according to claim 1, wherein said pocket is counter-shaped with respect to said first flap so as to allow an interference or shape coupling between said pocket and said first flap in said step (d).

3. The method according to claim 1, wherein said pocket is shaped so as to accommodate within it said first flap in said step (d) without shape or interference coupling.

4. The method according to claim 1 comprising a step (f) of at least partially deforming the pocket together with the first flap contained therein before said step (e), in order to create an irreversible coupling between said second metal sheet and said first flap at said pocket.

5. The method according to claim 1, wherein said bending angle is equal to 90°.

6. The method according to claim 1, wherein the upper surface of said second edge flap is lowered with respect to the upper surface of the sheet body of said second metal sheet by a predetermined height equivalent to the thickness of said first metal sheet so as to create a housing for the sheet body of said first metal sheet during step (d) that allows the upper surface of the sheet body of said first metal sheet to be positioned in a coplanar manner to the upper surface of the sheet body of said second metal sheet.

7. The method according to claim 1, wherein said first metal sheet and said second metal sheet have different thicknesses.

8. The method according to claim 1, wherein said first metal sheet has a thickness greater than the thickness of said second metal sheet.

9. The method according to claim 1, wherein said first metal sheet and said second metal sheet are made of different metal materials.

10. The method according to claim 1, wherein said first metal sheet and said second metal sheet have different surface finishes.

11. A metal laminate assembly comprising at least a first metal sheet and a second metal sheet joined to each other at a first and a second straight edge respectively by means of an irreversible mechanical coupling using the method of claim 1 for joining metal sheets, each metal sheet having a respective upper surface and a respective lower surface opposite each other in the direction of the thickness, wherein said irreversible mechanical coupling is defined by:

a first edge flap of said first metal sheet that extends along said first edge of said first metal sheet and is bent against the lower surface of said first sheet;

a second edge flap of said second metal sheet that extends along said second edge of said second sheet and rests on the lower surface of said first metal sheet, interposed between said first edge flap and said lower surface of said first metal sheet, wherein said second flap is connected to the rest of said second metal sheet by a bent portion of said second metal sheet, said bent portion being bent around said first flap, interposing itself between said first flap and said second flap.

12. The metal laminate assembly according to claim 11, wherein the upper surface of said second flap is parallel to the upper surface of said second metal sheet and wherein the upper surface if said first metal sheet is parallel to the upper surface of said second metal sheet.

13. The metal laminate assembly according to claim 12, wherein the upper surface of said second flap is lowered with respect to the upper surface of said second metal sheet by a height equivalent to the thickness of said first metal sheet and wherein the upper surface of said first metal sheet is coplanar with the upper surface of said second metal sheet.

14. The metal laminate assembly according to claim 11, wherein said first metal sheet and said second metal sheet have different thicknesses.

15. The metal laminate assembly according to claim 11, wherein said first metal sheet has a thickness greater than the thickness of said second metal sheet.

16. The metal laminate assembly according to claim 11, wherein said first metal sheet and said second metal sheet are made of different metal materials.

17. The metal laminate assembly according to claim 11, wherein said first metal sheet and said second metal sheet have different surface finishes.

18. The metal laminate assembly according to claim 11, obtained by joining together said first and said second metal sheets following the method of joining metal sheets.

* * * * *